Oct. 27, 1964     M. SUSSMAN ETAL     3,154,731
SPEED CONTROL SYSTEM FOR DYNAMO ELECTRIC MACHINE
Filed May 17, 1961     2 Sheets-Sheet 1
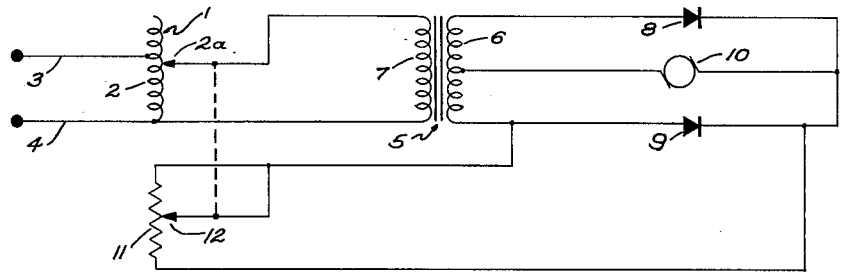
FIG_1_
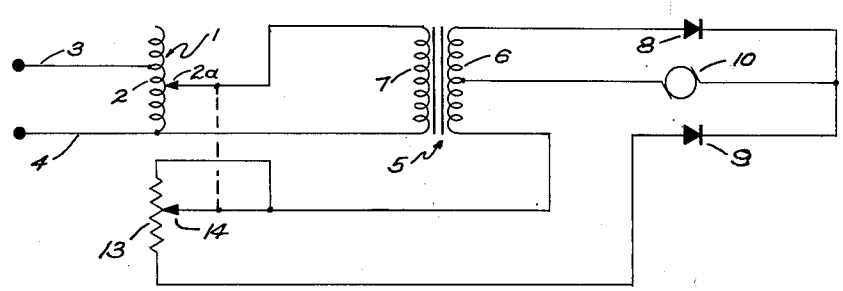
FIG_2_
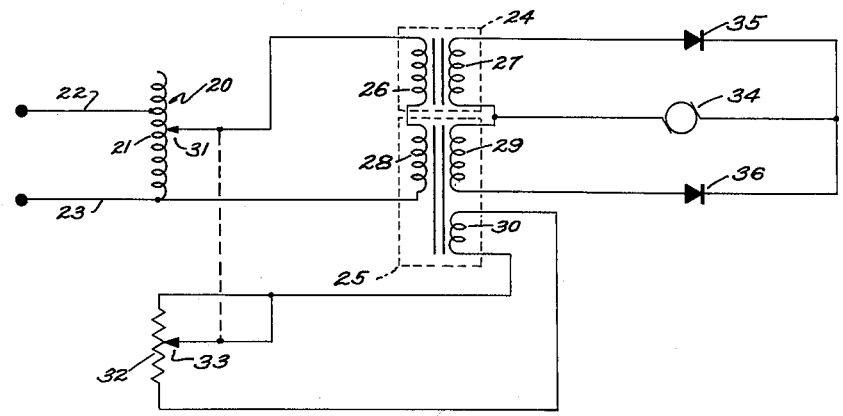
FIG_3_
INVENTORS
MAX SUSSMAN
JAY WARSHAWSKY
BY
ATTORNEY Oct. 27, 1964     M. SUSSMAN ETAL     3,154,731
SPEED CONTROL SYSTEM FOR DYNAMO ELECTRIC MACHINE
Filed May 17, 1961     2 Sheets-Sheet 2
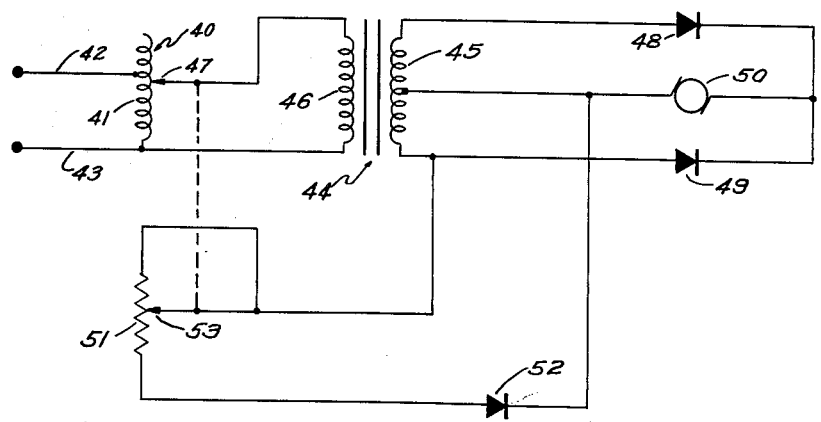
FIG_4_
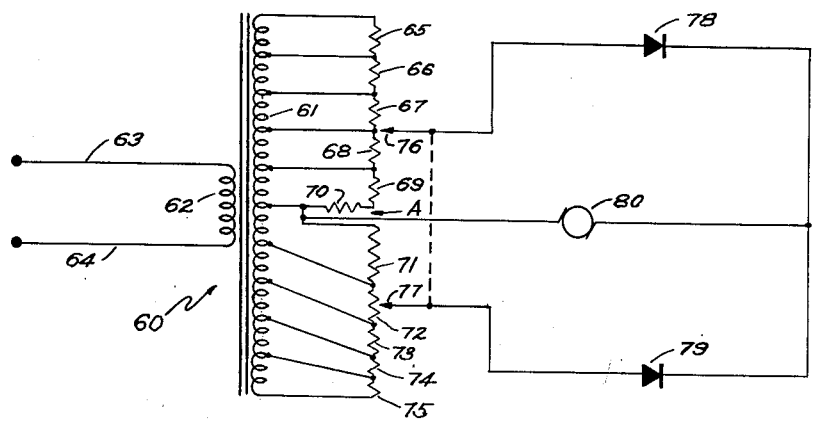
FIG_5_
INVENTORS
MAX SUSSMAN
JAY WARSHAWSKY
BY *Stewart F. Moore*
ATTORNEY

United States Patent Office 3,154,731
Patented Oct. 27, 1964

3,154,731
SPEED CONTROL SYSTEM FOR DYNAMO
ELECTRIC MACHINE
Max Sussman, Skokie, and Jay Warshawsky, Wilmette,
Ill., assignors to American Machinery & Foundry Company, a corporation of New Jersey
Filed May 17, 1961, Ser. No. 110,730
12 Claims. (Cl. 318—343)

This invention relates to the art of controlling electric motors and more particularly to a method and apparatus which can be employed to achieve control of a direct current motor operating from an alternating current source.

Friction is a well known and understood phenomenon posing problems in the design of electric motors and control systems therefor, particularly when the motor is designed to operate over a wide speed range including very low speeds. Charles A. Coulomb, better known for his work in the field of electric charges, noticed the basic coefficient of friction relationship in the late 1700's, so that, particularly in view of subsequent work, phenomena involving friction are well understood today. Basically, sliding friction is caused by interlocking of minute irregularities existing in the sliding surfaces, resulting in a force which resists the sliding motion. The size of the resisting force depends upon (1) the pressure between the surfaces, i.e., the weight of the object being moved in most instances, (2) the condition of the surfaces and (3) whether the surfaces are at rest or in motion with respect to one another. Because of this latter factor, both the static coefficient of friction and the kinetic coefficient of friction must be considered, a greater resisting force usually existing before motion begins.

Kinetic friction causes no serious problems in motor design other than the unavoidable loss in efficiency. Static friction, however, and more particularly the fact that the static friction is markedly greater than the kinetic friction, makes operation at very low speeds impossible unless special provisions are made. To place an electric motor in motion, sufficient energy must be supplied to overcome the static friction. However, once the static friction forces are overcome, the resisting forces decrease and the motor tends to overspeed. A subsequent attempt to slow the motor to a minimum operating speed can easily result in discontinuous rotation, a condition known as jogging. Jogging usually occurs when an attempt is made to operate the motor in the unstable transition range between static and kinetic frictional forces.

In motors employing oil-lubricated bearings, the problem caused by friction is even more severe because the difference between the static and kinetic frictional forces is even greater. When this type of bearing is employed, oil pressure built up by shaft rotation creates a hydrodynamic film to support the shaft. In effect, the transition from the rest condition to rotating conditions progresses through three steps, from static friction to lubricated surface kinetic friction and finally to hydrodynamic film kinetic friction, representing a considerable total transition.

The problems of overspeeding and jogging are overcome in the present invention by supplying pulse power to the motor instead of pure direct current power. Pulse power dithers the armature into rotation, giving an almost imperceptible breakaway action and hence allowing extremely low minimum operating speeds. Pulse power, however, is objectionalble at higher running speeds because it causes the motor to overheat or else requires that the motor size be increased to accommodate this rather inefficient type of power. Also, the size of the power supply required to develop the pulse power for the higher running speeds often makes the unit economically unfeasible. For example, if the pulse power is half-wave rectified power, the same size power supply could provide approximately twice as much full-wave power as it could half-wave power.

The present invention provides a method of motor control, and apparatus for carrying out the method, which substantially eliminates jogging and overspeed problems and which will not cause overheating when the motor is running at full load. Furthermore, the motor control system provided by this invention employs relatively few parts, is simple in its operation, and is reasonably compact and economical in that it permits the use of smaller, less expensive components.

Basically, motor control is achieved in accordance with this invention by starting the motor on half-wave rectified power and gradually converting to full-wave rectified power for maximum running speed. The half-wave power is of a pulsating nature and, therefore, overcomes the overspeed and jogging problems at low running speeds. The full-wave rectified power is reasonably smooth direct current power and therefore avoids the motor overheating and power supply size problems at the higher speeds.

In order that the manner in which these and other objects are attained in accordance with the invention can be understood in detail, reference is had to the accompanying drawings, which form a part of this specification, and wherein:

FIG. 1 is a schematic illustration of a motor control system according to a first embodiment of the invention;

FIG. 2 is a schematic illustration of a motor control system according to a second embodiment;

FIG. 3 is a schematic illustration of a motor control system according to a third embodiment;

FIG . 4 is a schematic illustration of a motor control system according to a fourth embodiment; and FIG. 5 is a schematic illustration of a motor control system according to a fifth embodiment.

The specific embodiments of this invention illustrated schematically in FIGS. 1–5 include a pair of diodes connected to the motor being controlled, the diodes being poled for operation during alternate half cycles. For low speeds, a relatively small amount of power is transmitted to the motor via one of the diodes, the other diode being disabled. For higher speeds, larger quantities of power are applied via both diodes, the formerly disabled diode being gradually rendered operative as increases in speed are desired. Finally, at full speed, maximum power is transmitted to the motor via both diodes equally.

It should be noted that half-wave rectified power arises when a single rectifier is connected to an alternating current source to permit current flow through a load during one half-cycle of the alternating wave form. The resulting current flow is of a direct current pulsating nature, with current flowing for a certain time duration, followed by a period of no current flow. A wave analysis of the half-wave rectified power wave form would indicate a substantial quantity of direct current power and a substantial alternating current waveform of the fundamental frequency superposed thereon. Full-wave rectified power arises when two or more rectifiers connected to the same load are poled for operation during alternate half cycles of the supply current. Full-wave power is very smooth direct current compared to the half-wave power and upon wave analysis shows no fundamental frequency components but does exhibit a small second harmonic component in addition to a substantial direct current component.

Considered more specifically, the motor control system illustrated in FIG. 1 comprises a variable autotransformer having a main winding 2 connecetd to an A.C. source (not shown) via conductors 3 and 4. The isolation transformer 5 has a center-tapped secondary winding 6 and a primary winding 7 connected between adjustable tap 2a and one end of main winding 2.

The ends of secondary winding 6 are connected to the anodes of diodes 8 and 9. A direct current motor 10 is connected between the center tap of secondary winding 6 and the common connection between the cathodes of diodes 8 and 9. A variable resistance 11 is connected in parallel with diode 9. The adjustable tap 12 of resistance 11 is mechanically linked with the variable tap 2a of a variable autotransformer 1 so that, as the transformer output increases, the resistance of variable resistance 11 also increases.

When low operating speeds are desired, variable taps 2a and 12 are adjusted to their lowermost positions, so that the output voltage of the variable transformer is comparatively low and the resistance shunting diode 9 is also very low. Under these circumstances, diode 9 is disabled and therefore a comparatively small amount of power is delivered to motor 10 via diode 8, this power being of a half-wave rectified pulsating nature operative to dither the motor into operation at low speeds. The power delivered via shunted diode 9 is alternating current power and has no substantial effect on direct current motor 10 at low speeds. When higher speeds are desired, variable taps 2a and 12 are moved upwardly, as viewed, so that the variable transformer provides a higher output voltage and the impedance shunting diode 9 is increased. Under these circumstances, half-wave rectified power is transmitted to the motor via diode 8 and half-wave rectified power is delivered during alternate half cycles, but to a lesser degree, via diode 9. When the maximum running speed is desired, variable taps 2a and 12 are placed in their uppermost positions so that maximum voltage is available at the output of the variable transformer and maximum shunting resistance is provided across diode 9. Essentially full-wave rectified power is thus transmitted to motor 10 via the diodes 8 and 9, which conduct equally on alternate half-cycles.

The motor control system illustrated schematically in FIG. 2 is in many respects similar to that illustrated in FIG. 1 and therefore similar reference numerals are employed. The essential difference is that a variable resistance 13 having a variable tap 14 is connected in series with diode 9 instead of in parallel, as was the case in FIG. 1. The difference in operation is that, for low running speeds, a high resistance is inserted in series with diode 9 to disable this diode and therefore half-wave rectified power is supplied to motor 10 via diode 8. When higher operating speeds are desired, the value of variable resistance 13 is decreased as the output voltage from variable transformer 1 is increased. For maximum operating speeds, a maximum voltage is provided by variable transformer 1 and the series resistance of resistance 13 is reduced to zero, so that diode 9 is fully operative and full-wave power is supplied to motor 10 via the diodes 8 and 9. Variable tap 14 is of course mechanically linked to variable tap 2a so that the resistance value of variable resistance 13 decreases as to the output voltage from variable autotransformer 1 increases.

The motor control apparatus illustrated schematically in FIG. 3 comprises a variable autotransformer 20 having a main winding 21, a portion of which is connected to an A.C. source (not shown) via conductors 22 and 23. A pair of isolation transformers 24 and 25 are employed, transformer 24 having a primary winding 26 and a secondary winding 27, and isolation transformer 25 having a primary winding 28 and two secondary windings 29 and 30. Primary windings 26 and 28 are connected in series between adjustable tap 31 and one end of winding 21.

Variable resistance 32, having a variable tap 33, is connected across secondary winding 30. When the value of resistance 32 is reduced to zero, secondary winding 30 is short-circuited and virtually no energy is coupled into secondary winding 29. As the resistance value across secondary winding 30 is increased, an increased amount of energy is coupled into secondary winding 29. Isolation transformer 25 is therefore a type of variable transformer and is shown merely as being representative of numerous variable transformer devices. For example, transformer 25 could be replaced by a variable autotransformer, or by a saturable transformer.

One end of secondary winding 27 and one end of secondary winding 29 are connected together and to one side of the D.C. motor 34. The other end of secondary windings 27 and 29 are connected respectively to the anodes of diodes 35 and 36. The cathodes of these diodes are connected to the other side of motor 34.

Variable taps 31 and 33 are mechanically linked so that, when the variable transformer has a minimum output voltage, variable resistance 32 provides minimum resistance. Accordingly, as the variable tap 31 is moved to increase the output from the variable transformer, variable tap 33 moves in a direction to increase the value of resistance 32.

When minimum speed is desired, variable transformer 20 is adjusted to provide a minimum output and therefore variable resistance 32 provides minimum shunting resistance across secondary winding 30. Accordingly, a small amount of half-wave rectified power is transmitted to motor 34 via diode 35, and no power is transmitted via diode 36 because transformer 25 produces no substantial output. When higher speeds are desired, the output from the variable transformer is increased, and the resistance shunting secondary winding 30 is increased so that power is transmitted to motor 34 via both diodes. the quantity of power delivered via diode 35 being larger. When maximum speed is desired, tap 31 is adjusted to provide maximum output from variable transformer 20 and resistance 32 provides a maximum resistance across secondary winding 30 so that essentially full-wave rectified power is supplied to motor 34 via the diodes 35 and 36 conducting equally on alternate half-cycles.

The motor control system illustrated in FIG. 4 comprises a variable autotransformer 40 having a main winding 41 connected to a suitable A.C. source (not shown) via conductors 42 and 43. Isolation transformer 44 has a center-tapped secondary winding 45, and a primary winding 46 connected between adjustable tap 47 and one end of main winding 41. The anodes of diodes 48 and 49 are connected to the ends of secondary winding 45 and motor 50 is connected between the center tap of winding 45 and the common cathode connection between diodes 48 and 49. A variable resistance 51, in series with a diode 52, is connected serially between the center tap of secondary winding 45 and the end of this winding to which diode 49 is connected. Diode 52 is poled for operation during the same half-cycle as diode 49.

Adjustable tap 47 of transformer 40 is mechanically linked to adjustable tap 53 of variable resistance 51. The adjustable taps are linked so that, as the transformer output is increased, the resistance of variable resistance 51 will also be increased.

When minimum speed is desired, taps 47 and 53 are adjusted so that variable autotransformer 40 provides a minimum output voltage and resistance 51 provides a minimum resistance. Under these circumstances, a small amount of half-wave rectified power is transmitted to motor 50 via diode 48. Diode 49 is disabled since the path via variable resistance 51 (at this point adjusted for essentially zero resistance) and diode 52 effectively short circuits the higher resistance path through diode 49 and motor 50. When higher speeds are desired, taps 47 and 53 are adjusted to provide a higher transformer output and a higher resistance for 51. Accordingly, power is transmitted to motor 50 via both diodes 48 and 49, diode 48 providing the larger amount of power. When maximum speed is desired, taps 47 and 53 are adjusted to provide a maximum transformer output and a maximum resistance in series with diode 52. Under these circumstances, diode 52 is disabled and motor 50 is supplied with essentially full wave power via diodes 48 and 49 conducting during alternate half cycles.

The motor control system illustrated in FIG. 5 comprises a transformer 60 having a multi-tapped secondary winding 61 and a primary winding 62 connectable to an A.C. source (not shown) via conductors 63 and 64. Resistances 65–70 are connected between successive taps of secondary winding 61 so that the potential increases from a fixed minimum potential linearly as the distance from the center point A increases. Resistances 71–75 are connected to the remaining taps of secondary winding 61 so that the potential increases non-linearly with distance from center point A, i.e., increasing from zero at the center point slowly at first and then more rapidly as the distance increases. The adjustable taps 76 and 77 are arranged to slidably engage the resistances 65–69 and 71–75 respectively. The transformer taps and the intermediate resistances are used to provide gradual control of these voltages applied to the motor 80, the intermediate resistances providing for a gradual transition from tap-to-tap. The taps are mechanically linked so that they may be mechanically moved uniformly away from the transformer center tap A. With this arrangement, when the taps are in their uppermost positions, a small potential is available at tap 77 and no potential is available at tap 77. As the taps 76, 77 are moved progressively outwardly, the potential at tap 76 increases linearly with distance and the potential at tap 77 increases at first slowly and then more rapidly. When taps 76, 77 are in their outermost positions, the same alternating current potential is present at both taps.

Taps 76, 77 are connected to the anodes of diodes 78 and 79 respectively. The terminals of D.C. motor 80 are connected respectively to the center tap of secondary winding 61 and the common connection between the cathodes of diodes 78 and 79.

When a minimum operating speed is desired, the taps 76 and 77 are positioned in their uppermost positions and therefore potential is supplied to motor 80 only via diode 78. When higher operating speeds are desired, the taps 76 and 77 are moved downwardly and therefore energy is transmitted to motor 80 via diode 78 and 79. For maximum operating speed, taps 76 and 77 are placed in their outermost positions and therefore motor 80 is provided with full-wave rectified power via the diodes.

It will be understood that all of the apparatus embodiments shown and described are operable to carry out the method of the present invention wherein half-wave rectified current is supplied to the motor at a lower power level when the motor is to be started and operated at low speeds, direct current of increasingly less pulsating nature is supplied to the motor for operation at increasingly higher speeds, and substantially pure full-wave rectified current is supplied to the motor for high speed operation, the power level being increased in accordance with the speed desired.

The several embodiments of the invention shown and described are illustrative, and it will be recognized by those skilled in the art that various changes and modifications can be made without departing from the scope of the invention as defined in the appended claims.

What is claimed is:

1. In a system for operating a D.C. motor from an A.C. source, a power circuit connected between the source and the motor including in its input adjustable means for adjusting the A.C. voltage of the power supplied from said source and a pair of asymmetric conductive devices fed with the adjusted voltage output of said adjustable means, said devices being poled so as to respectively pass current to said motor during alternate half cycles of the applied A.C. voltage, and other control means responsive to the adjustment of said adjustable means providing a relatively low value input voltage to said devices, to effectively disable one of said devices while allowing normal operation of the other device to supply rectified half-wave power to said motor to start it into operation and to maintain it operating at relatively low speeds, and responsive to adjustments of the adjustable means providing given increases above said low value in the input voltage applied to said devices, to condition said one device only so that it supplies to said motor proportional increases in its rectified output current level thereby adjusting the rectified power applied to said motor by both of said devices in accordance with the higher motor speed desired.

2. A motor control system in accordance with claim 1, said other control means being operative to increase the output rectified current level of said one device when said adjustable voltage control means is adjusted to increase the voltage, and to decrease said output current level of said one device when said adjustable voltage control means is adjusted to decrease the voltage.

3. A motor control system in accordance with claim 1 and wherein said asymmetric conductive devices connected in said power circuit provide full-wave rectification when the adjustment of said adjustable voltage means is such as to cause maximum running speed of said motor.

4. In a direct current motor control system operable from an A.C. source, the combination of a direct current motor, adjustable means for controlling the voltage output of said source, first and second energizing means fed from the output of said adjustable means respectively operatively connected to pass direct current to said motor during alternate half-cycles of the applied A.C. voltage; and circuit means responsive to the adjustment of said adjustable means and connected between that means and one of said energizing means, said circuit means being operative to energize said motor via one of said energizing means when a minimum motor speed is desired, via both of said energizing means equally when a maximum motor speed is desired, and via both of said energizing means and to a proportionally lesser degree for one than the other of said energizing means when intermediate speeds are desired.

5. A motor control system in accordance with claim 4, and wherein said first and second energizing means each comprise an asymmetric device poled for conduction during the half-cycle during which the respective energizing means passes current to said motor.

6. In a motor control system for operating a direct current motor from an A.C. source, the combination of at least two asymmetric conductive devices each connected to the motor and poled for conduction during alternate half-cycles of the voltage supplied from said source, variable transformer means connectable to the A.C. source and operative to energize the motor via said asymmetric conductive devices, a variable impedance in electrical circuit relation with only one of said asymmetric devices and operative to control the quantity of energy supplied to the motor via that one of the two asymmetric devices, and means coupling said variable transformer means and said variable impedance so that the effectiveness of said one asymmetric device decreases as the voltage output from the variable transformer means is decreased.

7. A motor control system in accordance with claim 6, wherein said impedance is connected in parallel with said one asymmetric device.

8. A motor control system in accordance with claim 6, wherein said impedance is connected in series with said one asymmetric device.

9. A motor control system in accordance with claim 6, wherein said impedance is connected to said variable transformer means so as to control the portion of the output provided to the motor via said one asymmetric device.

10. In a motor control system for operating a direct current motor from an A.C. source, the combination of at least two asymmetric conductive devices each connected to the motor and poled for conduction during alternate half-cycles, variable transformer means connectable to the A.C. source and operative to energize the motor via said asymmetric conductive devices, said variable transformer means comprising a variable autotransformer providing energy to a pair of isolation transformers each connected to a different one of said asymmetric devices, one of said isolation transformers being adjustable to decrease the coupling between the primary and secondary winding thereof, and mechanical means linking said variable autotransformer and the adjustable one of said isolation transformers so that the coupling between said primary and secondary windings decreases as the output from said autotransformer is decreased.

11. In a motor control system for operating a D.C. motor from an A.C. source, the combination of first and second asymmetric conductive devices poled for conduction during alternate half-cycles and each connected to the motor, variable transformer means connectable to the A.C. source and operative to energize the motor via said first and second asymmetric devices, a third asymmetric conducting device poled for conduction during the same half-cycle as said second asymmetric device, control circuit means including said third asymmetric device and connected to provide a bypass current path of adjustable impedance around the motor during the half-cycle in which said third asymmetric device is conductive, and means linking said variable transformer and said control circuit means so that the impedance of said bypass path increases as said transformer output increases.

12. In a system for operating a D.C. motor from an A.C. source, the combination of transformer means having an input connectable to the A.C. source and also having output terminals; resistance means having end points and a medial point, output terminals of said transformer means being so connected to said resistance means that, on one side of said medial point, the potential increases uniformly with increase in distance toward one end point of said resistance means and, on the other side of said medial point, the potential increases non-uniformly with increase in distance toward the other end point; two taps each adjustable along said resistance means on a different side of said medial point, said taps being ganged so that they may be made to move mechanically uniformly away from said medial point; and two asymmetric conductive devices each connected to a different one of said taps and connectable to the motor to supply current thereto, said asymmetric devices being poled to pass current on alternate half-cycles of the A.C. potential afforded by the source.

References Cited in the file of this patent
UNITED STATES PATENTS

| | | |
|---|---|---|
| 2,100,715 | Jenks | Nov. 30, 1937 |
| 3,009,071 | Morton | Nov. 14, 1961 |
| 3,022,454 | Millis | Feb. 20, 1962 |